Patented Nov. 13, 1934

1,980,221

UNITED STATES PATENT OFFICE 1,980,221

BRAKE LINING COMPOUND AND METHOD OF MANUFACTURING IT

William Nanfeldt, Clifton, N. J., assignor to World Bestos Corporation, Paterson, N. J., a corporation of Delaware No Drawing. Application July 9, 1931, Serial No. 549,796

17 Claims. (Cl. 91—70)

This invention relates to brake lining used for the brakes of vehicles such as automobiles and particularly to a resinous material adapted to be impregnated into a brake lining as a bonding, lubricating material to increase the frictional qualities thereof and otherwise improve the operation of the brake.

One of the great problems in the efficient braking of moving elements such as the wheels of an automotive vehicle has been the scoring of the brake drums due to the high frictional resistances offered by the lining to the drum. Bonding materials which have heretofore been used in most brake linings become hardened with heat thereby causing the lining to become abrasive and score the brake drums which are generally made of normal low carbon steel. Even in the case where the bonding material is formed of rubber the heat destroys the rubber and causes the asbestos and other filling material to become abrasive.

Synthetic resins or phenolic condensation products which have been extensively used as bonding agents in brake lining material are of the insoluble infusible type which with heat become harder causing the lining to become abrasive. Most of these resins themselves are very abrasive and will cut a steel drum. For example, a plain cotton fabric was treated with a bakelite resin in solution with alcohol and after being cured was used as a brake lining. After seven applications with a normal low carbon steel drum is scored very badly proving its abrasiveness to steel.

I have discovered that I can produce an artificial resinous material which is soluble and fusible and which is very satisfactory as a lubricating, bonding material for frictional elements as it does not harden under excessive heat nor will it become abrasive in use. It is also insoluble in petroleum oils and hence its action is not destroyed by the presence of grease or oil on the brake lining. I have found that if cresylic acid of a certain type is condensed with formaldehyde using not more than a little over half as much by weight of formaldehyde as cresylic acid and heating the mixture in a certain way the desired resinous material is produced.

The type of cresylic acid used is very important and the one I have found to give the best result is high in xylenols and has the following properties:

Specific gravity____ 1.025 at approximately 15° C.
Boiling range_____ 90% distills between 208° C. and 225° C.
Composition_____ a mixture of cresols, xylenols and homologues of xylenols.
Tar acid content___ 97% to 99%.

The formaldehyde used may be the commercial aqueous 40% formaldehyde solution although weaker solutions may be used but in that case a larger amount compared to the amount of cresylic acid is necessary. The formaldehyde and cresylic acid alone will condense together satisfactorily but the process may take a longer time than is convenient and hence I prefer to add a small amount of commercial ammonia of about 26° Baumé as a catalyst to speed up the reaction which may thus be reduced from four to five hours to about one-half an hour.

In one instance this artificial resinous material was made by me out of the above mentioned materials which were proportioned as follows:

6 parts by weight of cresylic acid.
3½ parts by weight of commercial 40% formaldehyde.
1 part by weight of commercial 26° Baumé ammonia.

I place the above materials in an open kettle on an oil bath and heat them at about 100° C. until all the water present has been eliminated and the resin when sampled on a glass plate shows a clear transparent film which remains the same even after cooling. At this stage this resin is soluble in acetone and in addition is also soluble in coal tar solvent and petroleum naphtha which are very desirable solvents to use for economical reasons for impregnating a brake lining with the resin.

The resin after it has been prepared as above may be thinned with coal tar solvent and impregnated into any desirable brake lining such as a fabric formed of woven asbestos yarns. The lining may then be heated in an oven at a moderate temperature to drive off the excess solvent and then passed gradually through an oven at 350° C. where the resin solidifies to a hard material. This material remains fusible and soluble in acetone but at this point, however, it is no longer soluble in coal tar solvent or in petroleum naphtha.

If desired less formaldehyde may be used, and good results may be obtained with between 1 and 3½ parts by weight using the same amount of cresylic acid but I prefer not to exceed the proportion given above.

In certain instances where greater frictional resistances are desired or for other reasons I may add to the materials named above before the heat treatment thereof, a vegetable oil such as China wood oil, linseed oil, or rapeseed oil the first two being preferred. Thus I may add to the mixture as proportioned above 1¼ parts by weight of double boiled linseed oil and 3¾ parts by weight of China wood oil (tung oil). This mixture is heated as outlined above but care should be taken in not heating it too long as this will cause the resin to separate from the oil into a solid cloudy mass in which the resin holds the oils in suspension. When properly prepared the resinous material is soluble in acetone and coal tar solvent but not in petroleum naphtha. In this case the oil does not appear to be a modifier for the resin but the resin appears to act as a modifier for the oil.

That the resin does actually modify the oil is borne out by the following facts: China wood oil alone heated at 340° C. for an hour will polymerize into a dry crumbly mass with no tensile strength. By the addition of a portion of linseed oil and forming a polymer there is more tensile strength, but with the addition of my resinous material there is a decided increase in tensile strength. If China wood oil which has polymerized is heated with some of the cresylic acid used in making this resinous material under a reflux condenser, the polymerized oil tends to swell and absorb the acid similar to the action of rubber when allowed to soak in a solvent. The rubber swells and absorbs the solvent. In the same way the resin is absorbed by the oil and when heated together form a strong, ductile, resinous material which is fusible and soluble in acetone.

A brake lining treated with my improved resinous material has greatly improved braking qualities over anything heretofore used. The resinous material will soften enough with heat to act as a lubricant but with no loss of its bonding qualities. It does not get hard or brittle or permit the asbestos to loosen and become abrasive. A rubber bonding material with high heat will decompose into an oil, losing all its bonding qualities.

The fact that the artificial resinous material is always soluble in acetone distinguishes it from other synthetic resins heretofore used which are insoluble in acetone. That it is always fusible so that it cannot form a hard polished surface or become abrasive is an important feature of the invention as is also the fact that the resin before the heat treatment is soluble in coal tar solvent or petroleum naphtha which are desirable so that it may be conveniently and economically introduced into the brake lining material.

The fibrous material for the brake lining may be made out of woven asbestos yarn as mentioned above or it may be molded in which case all of the material is mixed together and compressed into a block of the desired shape and size. In either type of lining various other ingredients may be added to the resinous material without departing from the spirit of the invention.

Many modifications of the invention may also be resorted to without departing from the spirit thereof, and I do not desire to limit myself to the specific embodiment described except as such limitations occur in the appended claims.

Having thus described my invention what I desire to claim and secure by Letters Patent is:

1. A brake lining impregnated with a fusible resinous material comprising 6 parts by weight of cresylic acid having a 90% boiling point in excess of 208° C., formaldehyde in amount equivalent to that contained in 3½ parts by weight of commercial 40% formaldehyde, one part by weight of commercial 26° Baumé ammonia.

2. A brake lining impregnated with a fusible resinous material comprising cresylic acid having a 90% boiling point in excess of 208° C. and formaldehyde condensed together, there being between 1.7 and 6 times as much cresylic acid by weight as commercial 40% formaldehyde.

3. A brake lining impregnated with a fusible resinous material comprising a vegetable oil, cresylic acid having a 90% boiling point in excess of 208° C., and formaldehyde, there being between 1.7 and 6 times as much cresylic acid by weight as there is commercial 40% formaldehyde, the three being condensed together.

4. A brake lining impregnated with a fusible resinous material comprising cresylic acid having a 90% boiling point in excess of 208° C. and 40% formaldehyde, linseed oil, and China wood oil, there being between 1.7 and 6 times as much cresylic acid as formaldehyde and about as much of the oils as cresylic acid.

5. A brake lining impregnated with a fusible resinous material comprising by weight 6 parts of cresylic acid having a 90% boiling point in excess of 208° C., 3½ parts of commercial 40% formaldehyde, one part commercial 26° Baumé ammonia, 1¼ parts double boiled linseed oil, and 3¾ parts China wood oil.

6. A brake lining impregnated with a resinous material comprising cresylic acid having a specific gravity of 1.025 at approximately 15° C. and a boiling range between 208° C. and 225° C., and commercial 40% formaldehyde, there being between 1.7 and 6 times by weight as much cresylic acid as formaldehyde.

7. A brake lining impregnated with a resinous material comprising cresylic acid having a specific gravity of 1.025 at approximately 15° C., a boiling range between 208° C. and 225° C., a composition of a mixture of cresols, xylenols, and homologues of xylenols, and a tar acid content between 97 and 99%; commercial 40% formaldehyde; and a vegetable oil, there being between 1.7 and 6 times by weight of cresylic acid as there is formaldehyde and about the same amount of vegetable oil as cresylic acid.

8. A resinous material for impregnating a brake lining comprising cresylic acid having a specific gravity of 1.025 at approximately 15° C. and commercial 40% formaldehyde condensed together, there being between 1.7 and 6 times as much cresylic acid as formaldehyde.

9. A resinous material for impregnating brake lining comprising cresylic acid having a minimum boiling temperature of approximately 208° C., and a specific gravity of 1.025 at approximately 15° C., and commercial 40% formaldehyde and double boiled linseed oil and China wood oil all condensed together, there being between 1.7 and 6 times as much cresylic acid as formaldehyde and about the same amount of oil as cresylic acid.

10. The method of making a fusible resin suitable for impregnation into brake lining material which comprises mixing together cresylic acid having a minimum boiling temperature of approximately 208° C., and a specific gravity of 1.025 at approximately 15° C. and not more than 1/12 by weight as much of 40% formaldehyde, and heating the mixture at a temperature of about 100° C. until all of the water present has been eliminated and the material when sampled on a glass plate shows a clear transparent film which remains the same even after cooling.

11. The method of making a fusible resinous material suitable to be used for impregnating brake lining which comprises mixing commercial 40% formaldehyde and between 1.7 and 6 times by weight as much cresylic acid having a minimum boiling temperature of approximately 208° C., and a specific gravity of 1.025 at approximately 15° C., heating the mixture at about 100° C. until all of the water present has been eliminated and the resin will form a clear transparent film on a glass plate which remains even after cooling, and thinning said resin with coal tar solvent.

12. The method of preparing a fusible resinous material suitable for impregnating into a brake lining which comprises heating at about 100° C. a mixture of commercial 40% formaldehyde, between 1.7 and 6 times as much by weight of cresylic acid having a minimum boiling temperature of approximately 208° C., and a specific gravity of 1.025, and about an equal portion of double boiled linseed oil and China wood oil, until all the water present has been eliminated and the resin will produce a clear transparent film on a glass plate which will remain when cooled.

13. The method of producing a material suitable for impregnating a brake lining which comprises heating at about 100° C. a mixture of commercial 40% formaldehyde, between 1.7 and 6 times as much cresylic acid having a specific gravity of 1.025 at approximately 15° C., and about an equal portion of linseed oil and China wood oil, until all the water present has been eliminated and the resin thus formed produces a clear transparent film on a glass plate which will remain when cooled, and thinning said resin with coal tar solvent.

14. A brake lining impregnated with a completely reacted fusible resinous material comprising approximately six parts by weight of cresylic acid having a 90% distillation range between 208° C. and 225° C., three and one-half parts by weight of commercial 40% formaldehyde, and a reaction catalyst.

15. A brake lining impregnated with a completely reacted fusible resinous material comprising a mixture of cresylic acid having a 90% distillation range between approximately 280° C. and 225° C., and formaldehyde.

16. A completely reacted fusible resinous material comprising cresylic acid having a 90% distillation range between approximately 208° C. and 225° C., and formaldehyde, said material being soluble in acetone.

17. A completely reacted fusible resinous material comprising cresylic acid having a 90% distillation range between approximately 208° C. and 225° C., and formaldehyde, said material being insoluble in coal tar solvents.

WILLIAM NANFELDT.